Figure 1:
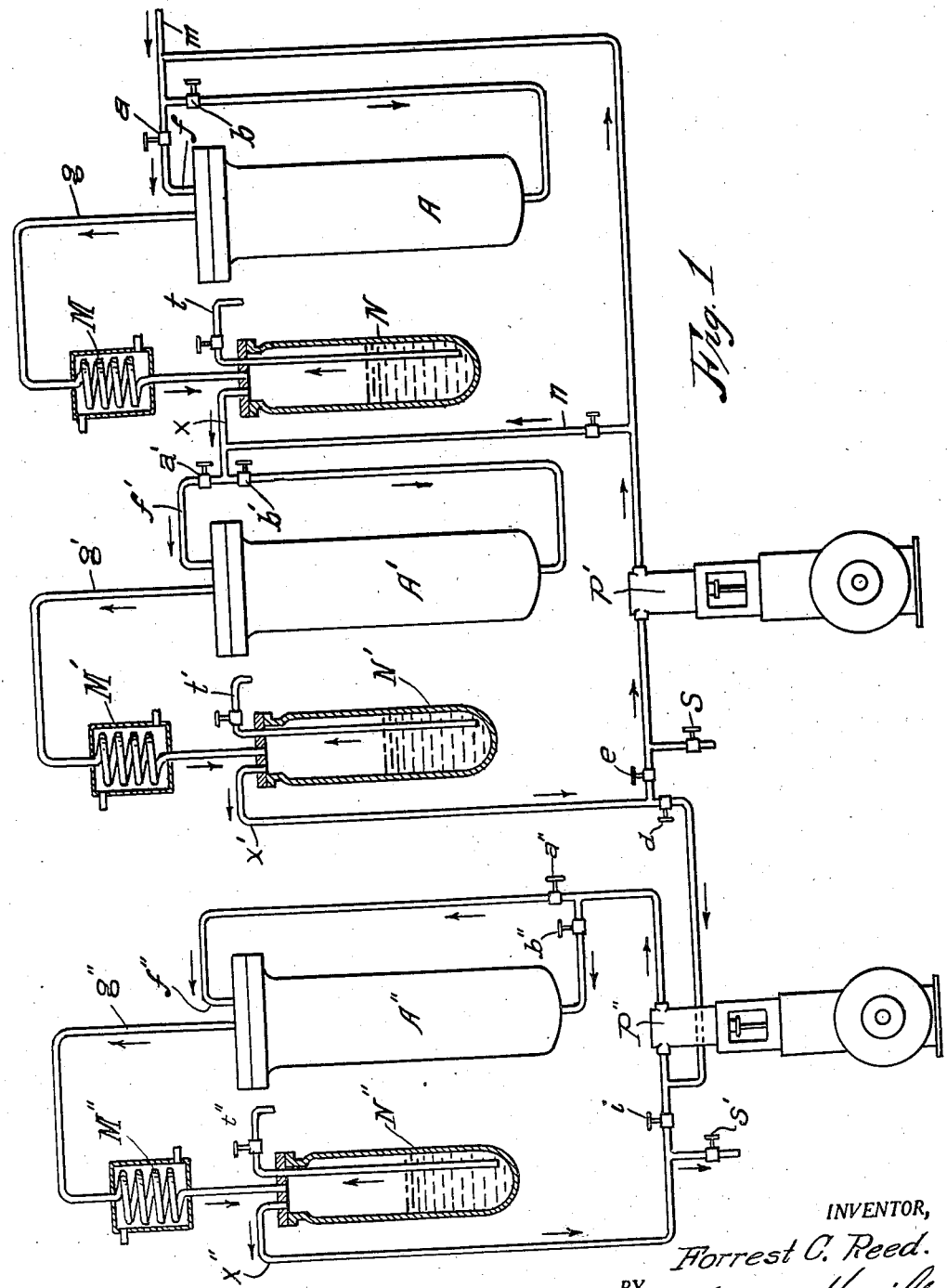

Patented Mar. 20, 1934

1,952,021

UNITED STATES PATENT OFFICE 1,952,021

PROCESS FOR THE DIRECT SYNTHESES OF AMMONIA

Forrest C. Reed, Kansas City, Mo.

Application April 3, 1931, Serial No. 527,396

26 Claims. (Cl. 23—199)

The present invention relates to processes for the direct synthesis of ammonia, and particularly to improvements in such processes involving the direct synthesis of ammonia from its elements, nitrogen and hydrogen, by passing said elements, mixed in the proper proportions, over a suitable catalyst at elevated temperatures and pressures, and when said elements contain a high initial precentage of inert gases, such as argon and methane.

In the art of producing ammonia with hydrogen obtained from water gas and nitrogen obtained from producer gas, there are present, in the initial gas mixture, inert gases such as argon and methane, the volume as given on page 113 of the Report on Fixation and Utilization of Nitrogen by Nitrate Division of the Ordnance Office, United States War Department, is from 0.5% to 1.0% of the entire gas mixture. These inert gases accumulate in the apparatus until further accumulation would result in retarding production at which time they must be purged with a resulting loss of hydrogen-nitrogen gas, the loss depending on the concentration of said inert gases in the system, from which they are purged.

In the production of ammonia with hydrogen obtained from coke oven gas or from the cracking of natural gas, where the percentage of methane is considerably over one per cent liquefaction of all the gases is resorted to in order to remove methane and other impurities. Equipment for this liquefaction is complicated and expensive. Furthermore, in producing hydrogen by cracking the hydrocarbons of natural gas, it is comparatively easy and economical to crack the gas to carbon and hydrogen having 5% of uncracked methane, while it is extremely difficult and expensive to crack to carbon and hydrogen having as low as 1% methane.

Advantages also reside in not cracking natural gas to completion because of the extremely high temperatures and long time of contact required which diminishes the value of the by-product carbon black; while cracking to the order of 5% of methane in the resulting gas mixture, a satisfactory grade of carbon black is produced.

Where ammonia is produced from water gas hydrogen and where the inerts in the initial gas mixture amount to as much as 1.0% methane and with the usual concentration of 10% in the circulatory system, the purge loss would be approximately $$\frac{100-10}{10} \times 1 = 9\%$$

of the gas mixture which in most cases would be permissible. If, however, the inerts in the initial gas mixture were of the order of 5% as in the use of hydrogen from natural gas, the purge loss would be $$\frac{100-10}{10} \times 5 = 45\%$$

of the gas mixture which would not be permissible. It is, therefore, obvious when producing ammonia from a hydrogen-nitrogen gas mixture having a high initial percentage of inert gases, that unless liquefaction of all the gases is resorted to for removing inerts, then suitable means must be provided to increase the concentration of inert gas in the circulatory system to a degree where purging becomes economical.

The primary object of the present invention is, therefore, to provide means for increasing the concentration of inert gas in the circulatory system, thereby reducing the loss of hydrogen and nitrogen when purging off inert gases and impurities, and permitting also the use of a hydrogen-nitrogen gas mixture having a high initial percentage of inert gases such as argon and methane; to provide means for maintaining substantally constant pressure of operation; to provide means for purification of the gas mixture; to provide improved disposition of catalytic body and direction of flow of gases; and to obtain flexibility of operation.

In order to obtain the foregoing and other advantages as may be brought out in the accompanying specifications and drawings, it is proposed to operate, in combination with each other, two complete systems of converters. One system of converters concentrates the inert gases to a degree economical with the desired production of ammonia and the other system of converters further concentrates the inerts to a degree economical for the purging of inert gases. Part of the gases are recirculated through the first system of converters and part of the gases, leaving the first system of converters, are circulated through the second system of converters. The first system of converters is hereinafter referred to as the primary system while the second system of converters is designated the secondary system. Either of said systems may consist of one or more converters. The primary system preferably consists of two converters; this especially where the make-up gas contains small amounts of impurities other than inert gases, such as oxygen, the oxides of carbon, and sulphur from lubricating oils in which case the first converter acts as a purifier, the catalyst retaining such poisons as sulphur and the oxides reacting from hydrogen to form methane and water. The water is removed with the liquid ammonia when the ammonia is condensed after the converter. Little or no ammonia might be formed in the first converter depending on the amounts of impurities present. If no ammonia is formed in first converter, the ammonia for absorbing impurities can be supplied in any suitable manner such as condensing the ammonia from the recirculated gas from the succeeding converters. The secondary system preferably consists of a single converter, the gas being either recirculated or passed through the converter but once and then allowed to escape.

In my United States Letters Patent No. 1,639,272 dated August 16, 1927, for Processes for the direct synthesis of ammonia, I have disclosed figures indicating approximately the advantages of the series cyclic process over former cyclic processes, especially for reaching high concentrations of inerts. The importance of temperatures, space velocities, and catalyst promoters on the efficiency of ammonia conversion is given on pages 21 to 29 inclusive of "Contributions to the Study of Ammonia Catalysts" from the U. S. Fixed Nitrogen Research Laboratory, reprinted from Chemical and Metallurgical Engineering, volume 26, Nos. 11, 12, 13, 14 and 15 March 15, 22 and 29, and April 5 and 12, 1922. For example: A catalyst operating at 510° C. on gas containing 0.082% of poisons will have the same efficiency as when operating on pure gas at 430° C. A catalyst operating on gas containing 0.10% of poisons will have the same efficiency at 5000 space velocity as with only 0.02% of poisons at 20,000 space velocity. A catalyst having a high efficiency on pure gas will have a low efficiency on impure gas while a catalyst having a low efficiency on pure gas will have a high efficiency on impure gas. Furthermore, the higher the conversion and therefore the more ammonia formed and removed with each passage of the gases over the catalyst, the higher will be the concentration of inert gases left with the unconverted hydrogen and nitrogen gases. The lower the cooling temperature after each converter the more ammonia removed and therefore the higher the concentration of inert gas remaining in the unconverted gases. If only a single converter were used as in the Haber (United States Letters Patent Number 1,202,995 dated October 31, 1916) cyclic process operating in conjunction with another plant such as an ammonium sulphate plant where the expanded ammonia used in cooling is used directly to neutralize sulphuric acid, it would not be practical to cool below −10° C. where the pressure of the expanded ammonia would correspond to the back pressure on the sulphate saturator.

In the process contemplated by the present invention, cooling after the concentrating converter can be carried to −50° C. by using ammonia compressors and recondensing the ammonia used for cooling while the cooling after the first converters can be regulated separately to suit the plant operation.

This process then permits for each converter, a catalyst, operating temperature, cooling temperature, and space velocity most suitable for each step in the process, i. e., for the removal of small amounts of poisons in the make-up gas, for the maximum production of ammonia, and for maximum concentrations of inert gases.

The accompanying drawings illustrate apparatus embodying the salient features of the invention and through the use of which the novel process might be performed.

Figure 2:
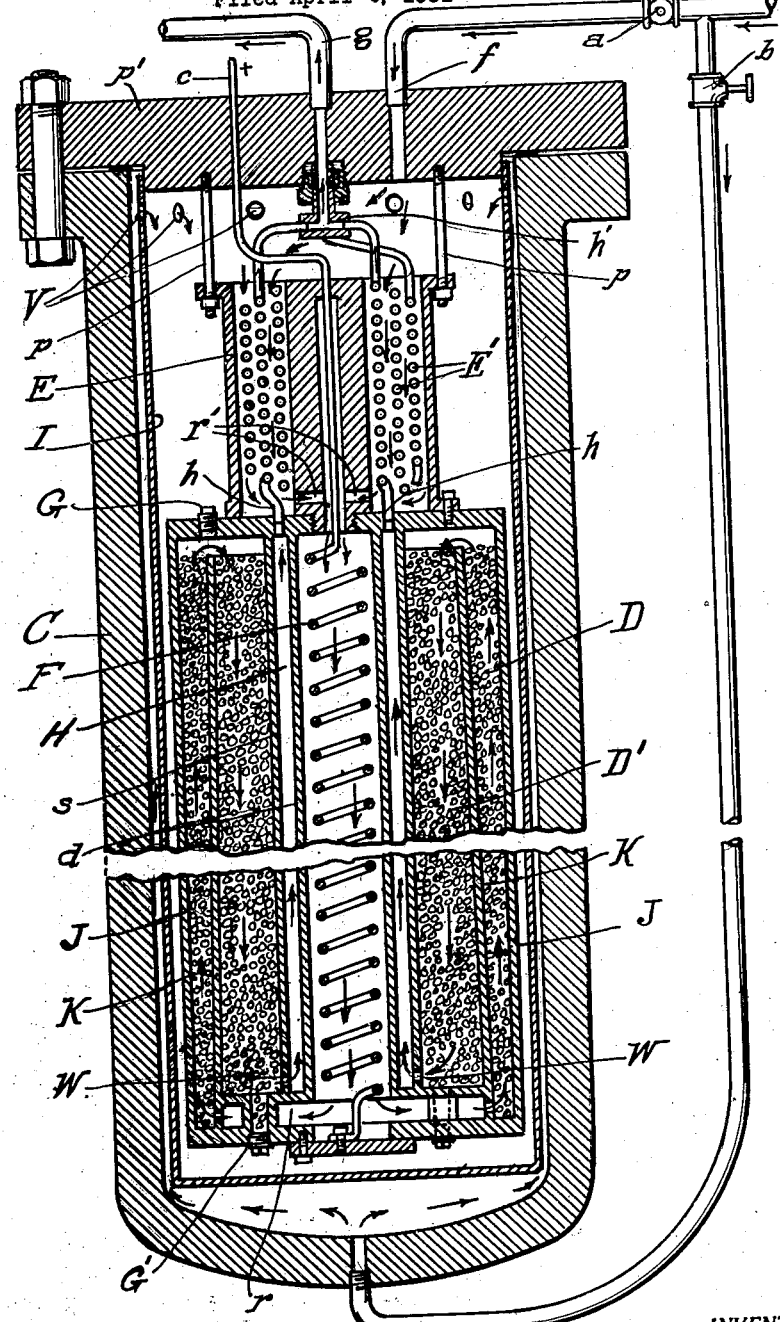

Figure 1 is a diagrammatical showing of apparatus adaptable for carrying out the process of the present invention, and Figure 2 is a vertical central section of a converter forming one of the units of the system.

Like reference characters designate similar parts throughout the views and A and A' of Figure 1 are primary converters operating in a series cyclical system wherein is interposed circulating pump P'. A" is a secondary converter operating in a separate cyclic system having circulating pump P" and utilizing part of the unconverted gas leaving converter A'. M, M', and M" are condensers. N, N', and N" are liquid ammonia receivers of well known construction.

Referring to Figure 2, C is a cylindrically formed pressure sustaining vessel, D and D' are catalytic materials, J is the outer wall of the catalytic chamber in which the wall K divides the catalytic mass into an inner and an outer body.

The catalyst chamber J is filled with suitable catalyst D and D' and is supported by suitable means such as by bolts $p$ to cover $p'$. The wall K could be either straight or preferably tapering conically as shown. Dividing the catalytic mass in this manner makes it possible to proportion the volumes of the two parts in such a manner that the heat generated by reaction is equalized and for reasons of strength the cooler part of the catalytic mass is nearest the walls of the pressure sustaining vessel C. E is a heat exchanger of suitable design, here shown as a plurality of spirally-wound tubes E', two or more tubes being wound together similar to a multiple threaded screw thread and communicatively connected to narrow passage H at $h$ and to outlet connection $g$ at $h'$. The cylindrically formed walls $s$ and $d$ form the narrow passage H communicating at bottom with inner catalyst body at W and with heat exchanger E at $h$. G and G' are holes through upper and lower ends respectively of the catalytic chamber for depositing and removing catalyst. I is a cylindrically formed shell closed at bottom forming a dead space between itself and catalyst chamber and a narrow space between itself and the wall of pressure sustaining vessel C. The pressure within the apparatus is equalized by suitable openings V. The space enclosing heater F is communicatively joined to outer catalyst space by passage $r$ formed at the bottom of the catalyst chamber.

The process may be carried out in the following manner: Hydrogen and nitrogen gas mixed in the proper proportions are supplied at $m$ in Fig. 1, the flow through the system being in the direction of the arrows. The flow through converters A, A', and A" can be seen by referring to Fig. 2. Electric current is supplied at C to heater F and a small amount of hydrogen and nitrogen gas of the proper mixture is admitted at $f$ and passed through the converter in the direction of arrows and out at $g$ while the temperature of the catalyst is brought up to reaction temperature. The pressure of the apparatus is then gradually increased to the operating pressure.

The gas entering at $f$ is conducted downwardly over the outside of tubes E' of heat exchanger E, through holes $r'$ to space surrounding heater F, from thence through passage $r$ at bottom of catalyst chamber to the outer catalytic body D where the flow is upward to the top and then downwardly through inner catalytic body D', through holes W to narrow passage H, then flowing upwardly into the inside of heat exchanger tubes E' at $h$ and out at $h'$ into outlet $g$. The ingoing gases are thus heated by the outgoing gases and the heat of reaction is usually sufficient to make the process autothermal in which case the electric heater is used only in starting the reaction. The reaction could as well be started by external heating of the gases. In order to control the heat exchange, part or all of the gases could be admitted at bottom of converter by manipulation of valves $a$ and $b$, the gases passing upwardly between cylindrical shell I and wall of pressure sustaining vessel C, through holes V and over heat exchanger as before.

Referring to Fig. 1, the mixture of hydrogen and nitrogen gas has passed through converter A of the primary system as above described, any poisons present, such as sulphur, have been absorbed by the catalyst and any oxygen or the oxides of carbon present have reacted with hydrogen to form methane and water, and part of the hydrogen-nitrogen mixture has been converted to ammonia gas. All of these gases are now conducted through pipe $g$ to condenser M where they are cooled and the ammonia liquefied and collected in the receiver N. Any water present is removed with the liquid ammonia. The liquid contents of receiver N is removed through pipe $t$ extending below the surface of the liquid so that the operating pressure forces the liquid ammonia out. The unconverted gases now purified except for the inert gases present are then conducted through pipe $x$ to converter A' where the procedure through the converter is the same as described for converter A, all or part of the gas passing through valve $a'$ to top of converter or through valve $b'$ to bottom of converter.

A portion of the gas leaving receiver N' through pipe $x'$ is recirculated with the fresh make up gas entering at $m$ through primary converters A and A' by means of circulating pump P', and the remaining portion of the gas leaving receiver N' is circulated through the separate secondary system of converter A'' by means of circulating pump P'' in the same manner as described for converter A. The volume of gas passing through either system is preferably controlled by valves $d$ and $e$ and by the speed of circulating pumps P' and P''. The inert gas is allowed to accumulate in the system of converters A and A' to a degree of concentration permissible with the desired production of ammonia. In order not to further increase the degree of concentration of inerts in converters A and A' of the primary system, a volume of gas, sufficient at this degree of concentration to carry inert gas, equal in volume to the inerts entering the primary system with the make up gas at $m$, must pass into the secondary system of converter A'' where the concentration is further increased to a degree where purging becomes economical and then the secondary system is continuously purged through valve S'. The primary system can be purged through valve S if desired. The purged gas can be used as fuel in gas engines or otherwise disposed of. In order to equalize conversion in converters A and A' and otherwise control operation, part of gas in primary system can be by-passed at $n$.

The catalyst, space velocity, operating temperature, and degree of cooling would be to suit the operating conditions in each converter. Converter A, to withstand the poisoning effect of the impurities in the gas, should preferably have a rugged catalyst and operate at comparatively high temperature and low space velocity.

Because of the water formed, it may be desirable to produce only a small amount of ammonia in converter A in which case water cooling after conversion would be sufficient to provide ammonia for purification purposes. Converter A' would have preferably a sensitive catalyst and operate at moderate temperature and comparatively high space velocity for maximum production. The cooling after conversion should be as low as permissible considering the disposition of the vaporized ammonia used in cooling. Converter A'', to offset the reduction of conversion due to the partial pressure of inert gas at high concentration, would have preferably a catalyst to operate at comparatively low temperature and space velocity and the cooling after conversion would be preferably by a two stage refrigeration machine with vacuum on suction to give cooling temperatures of the order of $-40°$ C., all of which tends to increase the amount of ammonia formed and removed with each passage of the gases over the catalyst and thereby increasing the concentration of inerts remaining in the gas.

Besides the advantage of suitable catalyst, space velocities, operating temperatures and cooling temperatures for each converter of the primary and secondary system, the operating pressure of secondary system can be boosted to a pressure at least as high as or even higher than the operating pressure of converter A' of the primary system which tends to further increase conversion in secondary system and thereby increasing the concentration of inerts. The operating pressure of an ammonia process is usually considered as substantially constant, yet through two converters there would be an appreciable drop in pressure which can be compensated for by the process of the present invention. A further advantage is the use of converter A as a purifier within the primary system which permits the use of oil for lubricant in circulating pump P' which is in the same relation to primary system as the compressor furnishing make up gas at $m$.

Any poisons from the oil would be removed in converter A thus insuring pure ammonia in converter A'. Ammonia lubrication would be preferable for circulating pump P'' of secondary system, in which case part of the ammonia formed in converter A'' would be condensed and passed through circulating pump P'' then further condensed and removed after circulating pump P. Furthermore the size of piping, condensers and circulating pumps of the present invention are materially reduced because of the reduced volume of recirculated gas.

While the apparatus shown in Fig. 1, has two converters in the primary system and one converter in the secondary system yet either system could as well consist of two or more converters without departing from the spirit and scope of the present invention. It is also possible to combine one secondary concentrating system with two or more primary systems. Furthermore the circulating pump P'' of the secondary system could as well be used to boost the operating pressure of secondary system to a pressure much higher than that of the primary system and thereby increase the conversion to such an extent that the residual gases leaving secondary system could either all be purged after the removal of ammonia and without further circulation, or recirculated by throttling with valve $i$.

Obviously there are other methods of carrying out the present invention therefore I do not wish

Having thus described the invention, what is claimed as new and desired to be secured by Letters Patent is:

1. The process of producing ammonia by passing a mixture of hydrogen and nitrogen over a suitable catalytic agent at elevated temperature and pressure and removing at a lower temperature the ammonia formed then again passing a portion of the residual gases over the same catalytic agent, while repeatedly passing another portion over a second catalytic agent in like manner, and removing at lower temperature, after each catalytic agent, the ammonia formed by each passage of gases over said catalytic agent and replacing the quantity of gases removed, with fresh hydrogen and nitrogen supplied to said first catalytic agent.

2. The process of producing ammonia by passing a mixture of hydrogen and nitrogen over a suitable catalytic agent at elevated temperature and pressure and removing at a lower temperature the ammonia formed then again passing a portion of the residual gases over the same catalytic agent, while repeatedly passing the remaining portion over a second catalytic agent in like manner, and removing at lower temperature, after each catalytic agent, the ammonia formed by each passage of gases over said catalytic agent and replacing the quantity of gases removed, with fresh hydrogen and nitrogen supplied to said first catalytic agent and while purging continuously from a point after ammonia has been removed from said second catalytic agent.

3. The process of producing ammonia by passing a mixture of hydrogen and nitrogen, after heat exchange with the gases of reaction and at elevated temperature and pressure, over a catalytic agent and removing at lower temperature the ammonia formed then again passing a portion of the residual gases over same catalytic agent, while repeatedly passing the remaining portion over a second catalytic agent in like manner and removing after each catalytic agent the ammonia formed by each passage over said catalytic agents and replacing the ammonia formed and removed by fresh hydrogen and nitrogen supplied to first catalytic agent.

4. The process of producing ammonia by passing a mixture of hydrogen and nitrogen, after heat exchange with the gases of reaction and at elevated temperature and pressure, over a catalytic agent and removing at lower temperature the ammonia formed, then again passing a portion of the residual gases over the same catalytic agent, while repeatedly passing the remaining portion over a second catalytic agent in like manner and removing after each catalytic agent the ammonia formed by each passage over said catalytic agents and replacing the ammonia formed and removed by fresh hydrogen and nitrogen supplied to first catalytic agent, and while starting the reaction by electric means.

5. The process of producing ammonia by passing a mixture of hydrogen and nitrogen mixed in suitable proportions, at elevated temperature and pressure, over a catalytic agent and removing at lower temperature the ammonia formed then again passing a portion of the residual gases over the same catalytic agent while repeatedly passing the remaining portion over a second catalytic agent, removing at lower temperature the ammonia formed by each passage of gases over said catalytic agent and purging continuously after said second catalytic agent after the ammonia has been removed while replacing the ammonia formed and the gases purged with fresh hydrogen and nitrogen supplied to the first of said catalytic agents and while passing the incoming gases in heat exchange with the outgoing gases from each of said catalytic agents.

6. The process of producing ammonia by passing a mixture of hydrogen and nitrogen mixed in suitable proportions, at elevated temperature and pressure, over a catalytic agent and removing at lower temperature the ammonia formed then again passing a portion of the residual gases over the same catalytic agent while repeatedly passing the remaining portion over a second catalytic agent, removing at lower temperature the ammonia formed by each passage of gases over said catalytic agent and purging after said second catalytic agent after the ammonia has been removed while replacing the ammonia formed and the gases purged with fresh hydrogen and nitrogen supplied to the first of said catalytic agents and while passing the incoming gases in heat exchange with the outgoing gases from each of said catalytic agents and while starting the reaction by electric means.

7. The process of producing ammonia by passing a mixture of hydrogen and nitrogen at elevated temperature and pressure over a catalytic body and removing at lower temperature the ammonia formed then again passing a portion of the residual gases over the same catalyst and repeatedly passing the remaining portion at increased pressure over a second separate catalytic body and removing the ammonia formed then purging after said second catalytic body, while replacing the ammonia formed and gases purged with fresh hydrogen and nitrogen supplied to first catalytic body, and while passing the ingoing gases in heat exchange with the outgoing gases from each of said catalytic bodies.

8. The process of producing ammonia by passing a mixture of hydrogen and nitrogen at elevated temperature and pressure over a catalytic agent, then removing, at lower temperature, the ammonia formed, then again passing a portion of the residual gases over the same catalyst and passing the remaining portion over a second catalyst, then removing, at lower temperature, the ammonia formed, then purging all the residual gases leaving said second catalyst while replacing the ammonia formed and the gases purged with fresh hydrogen and nitrogen supplied to first catalytic agent and while passing the ingoing gases in heat exchange with the outgoing gases from each of said catalytic agents.

9. The process of producing ammonia by passing a mixture of hydrogen and nitrogen at elevated temperature and pressure over a catalytic body and removing, at lower temperature, the ammonia formed, then again passing a portion of the residual gases over the same catalyst and repeatedly passing the remaining portion, at increased pressure, over a second separate catalytic body and removing the ammonia formed, then purging all the residual gases, leaving said second catalytic body, after the removal of ammonia while replacing the ammonia formed and gases purged with fresh hydrogen and nitrogen supplied to first catalytic body and while passing the ingoing gases in heat exchange with the outgoing gases from each of said catalytic bodies.

10. The process of producing ammonia by passing a mixture of hydrogen and nitrogen, at elevated temperature and pressure, over suitable catalytic agents arranged in series and removing at lower temperature, after each catalytic agent, the ammonia formed, then again passing a portion of the residual gases over the same catalytic agents while repeatedly passing another portion over another separate catalytic agent in like manner and removing the ammonia formed by each passage of gases over said catalytic agents while replacing the ammonia formed with fresh hydrogen and nitrogen supplied to first catalytic agent of said series.

11. The process of producing ammonia by passing a mixture of hydrogen and nitrogen, at elevated temperature and pressure, over a purifying catalytic mass then in contact with ammonia at lowered temperature, then over a second catalytic agent then removing, at lower temperature, the ammonia formed then again passing a portion of the residual gases over the same catalysts and passing the remaining portion repeatedly over a separate catalytic agent and removing the ammonia formed with each passage over said catalytic agent while replacing the ammonia formed with fresh hydrogen and nitrogen, supplied to the purifying catalytic mass, and while passing the ingoing gases in heat exchange with the outgoing gases from each of said catalysts.

12. The process of producing ammonia by passing a mixture of hydrogen and nitrogen, in suitable proportions at elevated temperature and pressure, over catalytic agents arranged in series and removing at lower temperature, after each catalytic agent, the ammonia formed, then again passing a portion of the residual gases over the same catalytic agents, while repeatedly passing the remaining portion over another separate catalytic agent in like manner, and removing the ammonia formed by each passage of gases over said separate catalytic agent and purging continuously after said separate catalytic agents, after the ammonia has been removed, while replacing the ammonia formed and gases purged with fresh hydrogen and nitrogen supplied to the first catalytic agent of said series and while passing the ingoing gases in heat exchange with the outgoing gases from each of said catalytic agents.

13. The process of producing ammonia by passing a mixture of hydrogen and nitrogen, in suitable proportions at elevated temperature and pressure, over catalytic agents arranged in series and removing at lower temperature, after each catalytic agent, the ammonia formed, then again passing a portion of the residual gases over the same catalytic agents, while repeatedly passing the remaining portion over another separate catalytic agent in like manner, and removing the ammonia formed by each passage of gases over said separate catalytic agent and purging after said separate catalytic agents, after the ammonia has been removed, while replacing the ammonia formed and gases purged with fresh hydrogen and nitrogen supplied to the first catalytic agent of said series and while passing the ingoing gases in heat exchange with the outgoing gases from each of said catalytic agents and while starting the reaction by electric means.

14. The process of producing ammonia by passing hydrogen and nitrogen, mixed in suitable proportion at elevated temperature and pressure, over catalytic agents arranged in series and removing at lower temperature, after each catalyst, the ammonia formed, then again recirculating a portion of the residual gases, over the same catalytic agents, and by-passing a portion of said recirculated gases to the second catalyst of said series and circulating repeatedly the remaining portion of said residual gases over another separate catalytic agent and removing the ammonia formed, then purging after said separate catalytic agent, after the ammonia has been removed, while replacing the ammonia removed and gases purged with fresh hydrogen and nitrogen supplied to the first catalytic agent of said series and while passing the ingoing gases in heat exchange with the outgoing gases of each of said catalytic agents.

15. The process of producing ammonia by passing a mixture of hydrogen and nitrogen, at elevated temperature and pressure, over suitable catalytic agents, arranged in series, and removing at lower temperature, after each catalytic agent, the ammonia formed, then again passing the residual gases over said catalytic agents and replacing the gases removed with fresh hydrogen and nitrogen supplied to the first catalytic agent of said series, said fresh hydrogen and nitrogen containing over one percent by volume of inert gases.

16. The process of producing ammonia by passing a mixture of hydrogen and nitrogen, at elevated temperature and pressure, over suitable catalytic agents arranged in series and removing, at lower temperature, after each catalytic agent, the ammonia formed, then again passing the residual gases over said catalytic agents and replacing the gases removed with fresh hydrogen and nitrogen supplied to the first catalytic agent of said series, said fresh hydrogen and nitrogen containing over one percent by volume of inert gases, while passing the ingoing gases in heat exchange with the outgoing gases from each of said catalytic agents.

17. The process of producing ammonia by passing a mixture of hydrogen and nitrogen, at elevated temperature and pressure, over suitable catalytic agents, arranged in series, and removing at lower temperature, after each catalytic agent, the ammonia formed, then again passing the residual gases over said catalytic agents and replacing the gases removed with fresh hydrogen and nitrogen supplied to the first catalytic agent of said series, said fresh hydrogen and nitrogen containing over one percent by volume of inert gases, while passing the ingoing gases in heat exchange with the outgoing gases, from each of said catalytic agents, and while purging after the last catalytic agent of the series and after the ammonia has been removed.

18. The process of producing ammonia by passing a mixture of hydrogen and nitrogen, at elevated temperature and pressure, over suitable catalytic agents, arranged in series, and removing at lower temperature, after each catalytic agent, the ammonia formed, then again passing the residual gases over said catalytic agents and replacing the gases removed with fresh hydrogen and nitrogen supplied to the first catalytic agent of said series while passing the ingoing gases in heat exchange with the outgoing gases, from each of said catalytic agents, and while purging after the last catalytic agent of the series and after the ammonia has been removed.

19. The process of producing ammonia by the synthesis of its elements in the presence of a catalyst, which comprises passing a mixture of hydrogen and nitrogen gas over a suitable catalytic body at an elevated temperature and pressure, said catalytic body being formed and divided into a plurality of concentric parts causing the gas to flow in opposite directions in each of said concentric parts and from the outer to the inner of said concentric parts.

20. The process of producing ammonia by the synthesis of its elements in the presence of a catalyst, which comprises passing a mixture of hydrogen and nitrogen gas over a suitable catalytic body at an elevated temperature and pressure, said catalytic body being formed and divided into a plurality of concentric parts causing the gas to flow in opposite directions in each of said concentric parts and from the outer to the inner of said concentric parts, and while causing the cooler gases entering the catalyst body to be heated through indirect heat exchange by the hotter gases of reaction leaving said catalyst body.

21. The process of producing ammonia by the synthesis of its elements in the presence of a catalyst, which comprises passing a mixture of hydrogen and nitrogen gas over a suitable catalytic body at an elevated temperature and pressure, said catalytic body being formed and divided into a plurality of concentric parts causing the gas to flow in opposite directions in each of said concentric parts and from the outer to the inner of said concentric parts, and while causing the cooler gases entering the catalyst body to be heated through indirect heat exchange by the hotter gases of reaction leaving said catalyst body and while starting the reaction by electric means.

22. The process of producing ammonia by passing a gaseous mixture, containing hydrogen and nitrogen in suitable proportions at eleveated temperature and pressure, over suitable catalytic agents arranged in series and removing, at lower temperature after each catalytic agent, the ammonia formed, then again passing a portion of the residual gases over the same catalytic agents while passing another portion over another separate catalytic agent and removing the ammonia formed, then purging the residual gases after said removal of ammonia while passing the ingoing gases in heat exchange with the outgoing gases from each of said catalytic agents.

23. The process of producing ammonia by passing a gaseous mixture, containing hydrogen and nitrogen in suitable proportions at elevated temperature and pressure, over suitable catalytic agents arranged in series and removing, at lower temperature after each catalytic agent, the ammonia formed, then again passing a portion of the residual gases over the same catalytic agents while passing another portion at increased pressure over a separate catalytic agent and removing the ammonia formed, then purging the residual gases after said removal of ammonia after said separate catalytic agent.

24. The process of producing ammonia by passing a gaseous mixture containing hydrogen and nitrogen in suitable proportions at elevated temperature and pressure, over suitable catalytic agents arranged in series and removing, at lower temperature after each catalytic agent, the ammonia formed, then again recirculating a portion of the residual gases over the same catalytic agents while circulating another portion of said residual gases at increased pressure over another separate catalytic agent and removing the ammonia formed by each passage of the gases over said catalytic agent.

25. The process of producing ammonia by passing a gaseous mixture, containing hydrogen and nitrogen in suitable proportions at elevated temperature and pressure, over suitable catalytic agents arranged in series and removing, at lower temperature after each catalytic agent, the ammonia formed, then again passing a portion of the residual gases over the same catalytic agents while circulating another portion of said residual gases, at increased pressure, over another separate catalytic agent and removing the ammonia formed by each passage of gases over said separate catalytic agent and purging after the removal of ammonia following said separate catalytic agent and while passing the ingoing gases in heat exchange with the outgoing gases from each of said catalytic agents and replacing the gases converted to ammonia and the gases purged with a fresh gaseous mixture containing hydrogen and nitrogen.

26. The process of producing ammonia by passing a gaseous mixture, containing hydrogen and nitrogen in suitable proportions at elevated temperature and pressure, over a suitable catalytic agent and removing the ammonia formed, then again passing a portion of the residual gases over the same catalytic agent while passing another portion of said residual gases over another separate catalytic agent and removing the ammonia formed and while replacing the gases removed by a fresh gaseous mixture containing hydrogen and nitrogen.

FORREST C. REED.